(12) United States Patent
Grah

(10) Patent No.: US 7,881,291 B2
(45) Date of Patent: Feb. 1, 2011

(54) PACKET CLASSIFICATION ACCELERATION USING SPECTRAL ANALYSIS

(75) Inventor: Adrian Grah, Kanata (CA)

(73) Assignee: Alcatel Lucent, Paris (FR)

( * ) Notice: Subject to any disclaimer, the term of this patent is extended or adjusted under 35 U.S.C. 154(b) by 1055 days.

(21) Appl. No.: 11/137,548

(22) Filed: May 26, 2005

(65) Prior Publication Data

US 2006/0268876 A1  Nov. 30, 2006

(51) Int. Cl.
*H04L 12/28* (2006.01)

(52) U.S. Cl. .................... 370/389; 370/392
(58) Field of Classification Search .......... 370/389
See application file for complete search history.

(56) References Cited

U.S. PATENT DOCUMENTS

| | | | |
|---|---|---|---|
| 6,542,460 B1 * | 4/2003 | Ring | 370/203 |
| 6,567,408 B1 * | 5/2003 | Li et al. | 370/395.31 |
| 7,227,842 B1 * | 6/2007 | Ji et al. | 370/235 |
| 2003/0224741 A1 * | 12/2003 | Sugar et al. | 455/115.1 |
| 2005/0259767 A1 * | 11/2005 | Garmany et al. | 375/343 |
| 2007/0274212 A1 * | 11/2007 | Kolenchery et al. | 370/232 |

OTHER PUBLICATIONS (Wang, et al.) "Fast Packet Classification Through Tuple Reduction and Lookahead Caching", Aug. 27, 2002, pp. 197-202, XP010603619.
(Chang F, et al.) "Approximate Caches for Packet Classification", Mar. 7, 2004, pp. 2196-2207, vol. 4, XP010740589.
(Kang, Li et al.) "Architectures for Packet Classification Caching", Sep. 28, 2003, pp. 111-117, XP010683511.
(Taylor, D E) "Survey & Taxonomy of Packet Classification Techniques", May 10, 2004, pp. 1-42, XP002401888.
(Gupta, P., et al) "Algorithms for Packet Classification", Mar. 2001, vol. 15, No. 2, pp. 24-32, XP011092081.
(Woo, T) "A Modular Approach to Packet Classification: Algorithms and Results", Mar. 26, 2000, vol. 3, pp. 1213-1222.
(Mitrou, N. et al.) "Scalable Packet Classification Through Maximum Entropy Hashing", 2004, pp. 296-307.

* cited by examiner

*Primary Examiner*—Daniel J Ryman
*Assistant Examiner*—John Blanton
(74) *Attorney, Agent, or Firm*—Kramer & Amado PC

(57) ABSTRACT

A method and packet filtering system that accelerates the packet classification problem is made. Using spectral analysis of rules and using real time spectral analysis of packets, it is possible to determine very quickly that a packet does not match any of the possible rules that have been defined. That is to say, using the packet filtering of the invention, there is no possibility of a false negative decision; when a packet is determined not to match any rule, the work of a packet classifier is complete. This method and system are also capable, with a high degree of accuracy, of determining that the packet has matched one of the defined rules, so that the packet may be then directed to a packet classifier to determine the specific rule it matches.

8 Claims, 3 Drawing Sheets

PACKET CLASSIFICATION ACCELERATION USING SPECTRAL ANALYSIS

FIELD OF THE INVENTION

The invention is directed to communication networks and in particular to a system and method for fast classification of packets using spectral analysis.

BACKGROUND OF THE INVENTION

One of the most important requirements for today's high-performance forwarding engines of Internet routers is the ability to identify the packets that belong to a certain flow (a flow is defined by some rule; a collection of rules is called a policy database or a classifier) and apply the actions necessary to satisfy an increasing set of service requirements. Identification of the flow of an incoming packet is termed packet filtering or packet classification.

Packet classification is a key technology for modern high performance routers, as it can be used to provide expedited forwarding of certain type of packets, to enforce security restrictions, or to trigger traffic monitoring. The traditional application of packet filters has been for providing firewall and security functions, such as dropping of unauthorized packets, redirection of packets to proxy servers, etc. The growing complexity of the Internet is creating new applications for packet classification, placing additional demands on the packet classification system of routers and other packet handling devices. An emerging application of packet filters is the identification and classification of packets originated by specific sites, customers, or applications. These actions are related to queueing, scheduling, and routing decisions using not only destination addresses but also source addresses, source port numbers, destination port numbers, etc. Large scale packet filtering functionality enables both edge and core routers to support flexible, customer-specific differentiated services that provide the resources necessary for meeting the services requirements subscribed for.

Packet filters should parse a large portion of the packet header, including information concerning the transport protocol, before forwarding decisions are made. In general, packet classification is performed according to a set of given patterns (rules) that are matched against specified fields in the header of the incoming packet. The router is designed to find the best matching rule among the set of rules that match an incoming packet. The rules are defined either by network management software or by real-time reservation protocols such as RSVP.

It is desirable to use rules that apply to ranges of addresses, port numbers, or protocols, and the rules should not be restricted to exact matches. This allows rules to apply to aggregates and keeps the number of rules to be specified manageable. If filter algorithms can only handle exact matches, then preprocessing must translate ranges in filter rules to exact values. This is infeasible since the size of the ranges grows exponentially with the length of the packet field on which the ranges are defined. As well, the rules must be assigned explicit priorities in order to resolve conflicts if rules overlap.

Many algorithms have been proposed to accomplish packet classification. However, these algorithms are computationally complex, requiring a large amount of space to store the rules, or a large number of memory accesses for an algorithm to perform the classification, or both. When a large number of rules are required for packet classification, all of the previously proposed algorithms become prohibitively expensive to implement for high speed, line rate, real time applications.

One popular hardware device for performing packet classification is a ternary content-addressable memory (TCAM). A TCAM is configured to search the header of the incoming packet against all entries in the forwarding table of the classified database in parallel. It keeps the entries in decreasing order of priority of the rules in a classifier or prefix length of the entries in a forwarding table. Keeping the list sorted under addition and deletion of rules in a classifier is an expensive operation as it takes a large number of memory shifts (write) operations in the worst case. The most common solutions used today for this problem only improve the response for the average case, but waste precious TCAM space, and may still not address a worst case scenario. It is known to use algorithms to manage the TCAM such that incremental update times remain small in the worst case. The principal drawbacks of these algorithms are high power consumption and inefficient representation of filters with port ranges.

Another solution used currently is to use bloom filters as classification filters. A bloom filter is an algorithm that allows one to quickly perform membership tests, the result being a true or false indication for membership. The filter is comprised of a set of k hash functions and a bit vector of a given length. A packet's key that is to be classified is run though the k hash functions. The result of each hash function sets a bit in the bit vector. This bit vector is then compared with a reference bit vector that has been preconfigured with the hash results of the classification database. However, bloom classification filters based are not practical since they are practically incapable of handling rules that are comprised of one or more ranges or wildcard values. To effectively use bloom filters in this scenario, each rule containing wildcards/ranges would need to be explicitly defined and entered into the bloom filter.

To summarize, the algorithms currently used for packet classification are very expensive in terms of space and time complexity. Their use is impractical for high speed, real time classification when a large number of rules exist. As packet rates continue to increase, the need for efficient packet classification methods becomes more and more important. There is a need to provide a means whereby the classification of packets can be accelerated. Furthermore, as deeper packet inspection becomes more prevalent, the processing load of such inspection within the datapath becomes an even greater problem. There is a need to provide a method and a system that significantly reduce the datapath processing load by eliminating packets from being processed by complex classification algorithms.

SUMMARY OF THE INVENTION

It is an object of the invention to provide a packet classification method and system that alleviates totally or in part the drawbacks of the existent packet classification systems and methods.

It is another object of the invention to provide a packet classification method and system that accelerate the packet classification and provides a high degree of accuracy in determining that the packet has matched one of the defined rules.

Accordingly, the invention provides a method for filtering packets in a real time stream of incoming packets, comprising the steps of: creating a key from a field in a packet, the field being specified by a set of packet classification rules; transforming the key into the spectral domain, thereby obtaining a spectral domain key; comparing the spectral domain key to a spectral envelope corresponding to the classification rules and obtaining a negative decision whenever the spectral domain key falls outside the spectral envelope, or a positive decision whenever the spectral domain key falls within the spectral envelope; and in the case of a positive decision, directing the packet to a packet filter for determining the specific rule of the set of rules that the packet matches.

The invention also provides a packet filtering system for classifying packets' in a real time stream of incoming packets, comprising: a key generator for creating a key from one or more fields of a packet, the fields being specified by a set of packet classification rules; a Fast Fourier Transform unit for transforming the key into the spectral domain, thereby obtaining a spectral domain key; and an envelope comparator for comparing the spectral domain key to a spectral envelope corresponding to the packet classification rules, and obtaining a negative decision whenever the spectral domain key falls outside the spectral envelope, or a negative decision whenever the spectral domain key falls within the spectral envelope.

Advantageously, the invention greatly reduces the load placed on any packet classification algorithm capable of finding exact rule matches, since the algorithm does not need to execute for all packets in a real time stream.

Another advantage of the invention is that it provides acceleration to any packet classification algorithm capable of finding exact rule matches by filtering out packets that are known not to match any of the rules. Applications may also exist whereby only a determination that a rule is not matched is required. Further, the amount of processing required by this method to perform the acceleration is independent of the number of rules in the rule set. Applications for this method include network security, billing, performance monitoring, and flow monitoring.

The method and system of the invention can be implemented in any packet classification filter used for applications such as network security, billing, performance monitoring, and flow monitoring.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

As indicated above, the packet filters (classifiers) for IP routers are based on a certain hardware structure or software algorithm for parsing a large portion of the packet header before forwarding decisions are made. The parsing is based on a set of rules that are defined either by network management software or by real-time reservation protocols. The rules are typically based on fields within the layer 3 headers (e.g. source and destination address fields, the protocol field, etc.) and layer 4 headers (e.g. the source and destination port numbers for TCP and UDP). The rules may specify a prefix, and often contain ranges and wildcards such that a search of a rule which may match a packet in question forms an n-dimensional space which must be searched. In this terminology, n is the number of fields within a header(s) that the packet classification problem is concerned with. Furthermore, a rule may specify a regular expression for each of several fields of the packet header. The header of the arriving packet may satisfy the conditions of more than one rule, in which case the rule with the highest priority determines the flow of the arriving packet. Furthermore, rules may be designed with a view to recognize malicious attacks (worms and viruses) by inspecting the packet payload at line rate to detect and filter packets containing worm signatures.

The invention simplifies the task of a packet filter by enabling the filter to make a quick decision if a packet in a real time flow should be parsed or not. This decision is made by comparing the spectral analysis of the rules with the spectral analysis of the packets in the stream. The comparison enables a fast determination if a packet does not match any of the possible rules that have been defined for the respective packet application. This result is termed here "a negative decision". That is to say, using the spectral analysis method and system according to the invention, there is no possibility of a false negative decision. When it is determined that a packet does not to match any rule, the work of the packet classifier is complete.

The spectral analysis method and system of the invention are also capable, with a high degree of accuracy, of determining if a packet has matched one of the defined rules. This result is termed here "a positive decision". In general, the rate at which packets are incorrectly deemed to match a rule of the rules set, i.e. to provide false positive decision, was determined experimentally to be less than 10%. Once a positive decision is determined, the packet will be accurately classified by the packet filter in order to determine the matching rule, if any.

In this way, the load placed on the packet filter for finding an exact rule match is greatly reduced, since not all the packets in the incoming real time stream are processed for rule matching. However, because of possible false positive results, a matching rule may not be always found.

Figure 1:
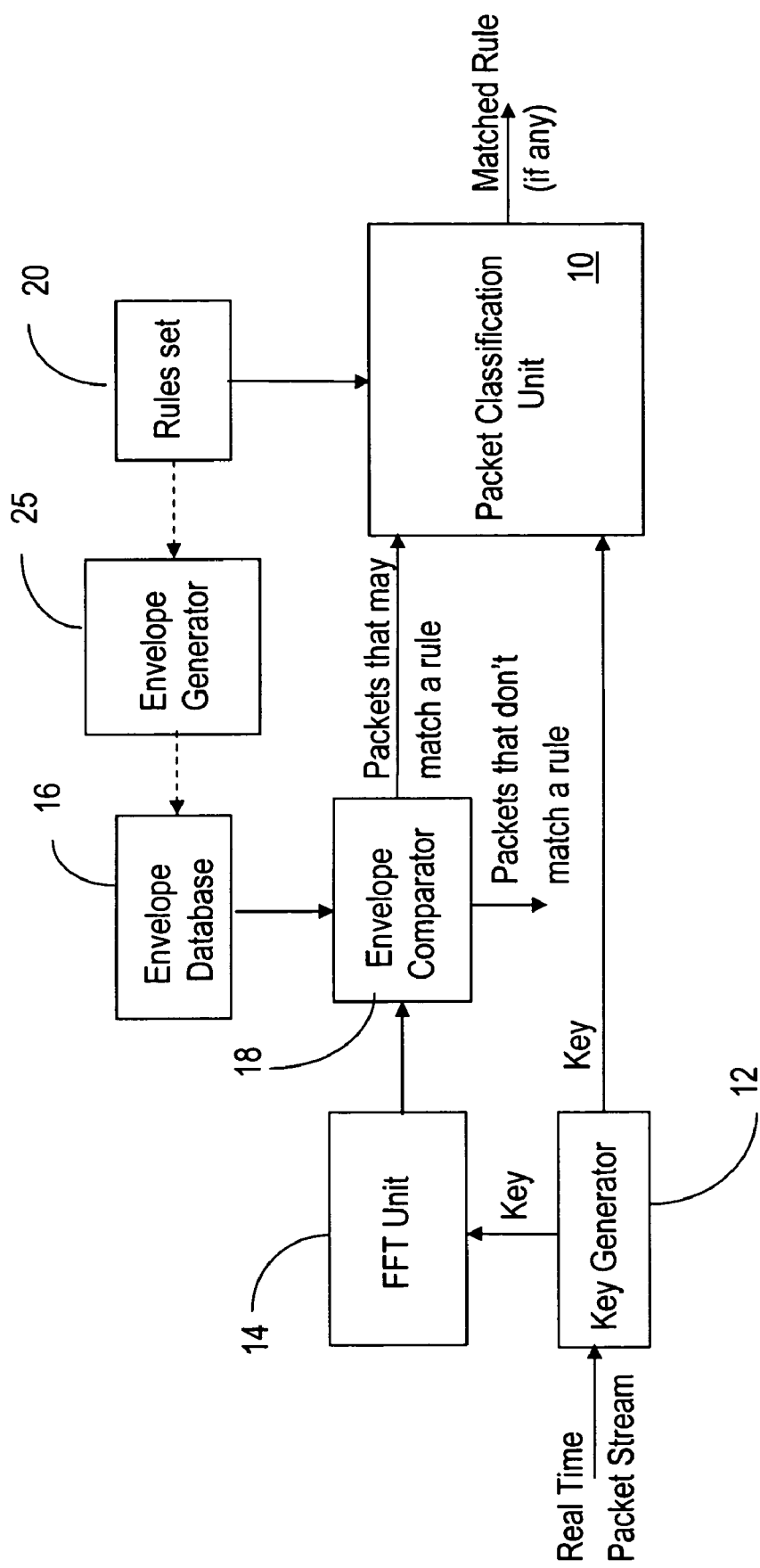
FIG. 1 illustrates a block diagram of the spectral packet classification system according to the invention.

FIG. 1 shows a basic schematic of the required elements for this invention. It comprises a rule matching packet classification unit 10 (packet filter or packet classifier) that classifies the packets according to a set of rules 20; as indicated above, the rules are defined either by network management software or by real-time reservation protocols such as RSVP. Phase and amplitude envelopes are generated from the respective rule set 20 by an offline process 25. This envelope generator process 25 calculates the phase and amplitude for each rule, by superposing the individual spectral results. It determines the minimum and maximum values for each frequency component over all rules of a respective set. As a simple example, three classification rules whose frequency amplitude components are $\{0,3,4\}$, $\{2,1,3\}$, and $\{1,2,1\}$ will result in a frequency amplitudes envelope being $\min\{0,1,1\}$ and $\max\{2,3,4\}$.

The results generated by envelope generator process 25 are then stored in an envelope database 16 for further use. Since a router may use a plurality of rule sets to classify the packets, database 16 stores a plurality of amplitude and phase envelopes (one envelope for amplitude and another for phase) predetermined from spectrally analyzing the respective set of rules.

A key generator 12 creates a packet key from an incoming packet that requires classification. This key consists of all fields that exist in the rule set; if the number of fields within a header(s) that the packet classification problem is concerned with is denoted with n, the key is referred to as an "n-tuple". For example, a standard 5-tuple may be employed, which consists of packets Source IP Address, Destination IP Address, Protocol, Source Port, and Destination Port. The key is then passed to a fast Fourier transform (FFT) unit 14 which transforms the key into a complex number, referred here as a spectral domain key, which provides the phase and amplitude values for each frequency for the key of a respective packet.

The complex number for each component frequency determined by unit 14 is then used by an envelope comparator 18 to determine whether or not the spectral domain key is within phase and amplitude envelopes that are defined by the current rule set. If for each frequency, the values of the phase and amplitude frequency are within the bounds of the minimum and maximum values of the envelopes, then the key is considered to be inside the spectral envelope. Otherwise, the key is considered to be outside the spectral envelope of the rule set. The envelope comparator 18 supplies a result, referred herein as "rule match", indicating that either no matching rule exists for this packet (negative decision), or that there may be a rule that matches (positive decision). Only when the spectral analysis determines that a match may exist would the packet classification unit 10 analyze the packet. A positive decision is used as an input to the packet classification unit 10 that can determine the exact rule matching for the respective packet. The packet classification unit 10 does not classify packets for which spectral analysis determined not to have a matching rule (negative decision).

Figure 2:
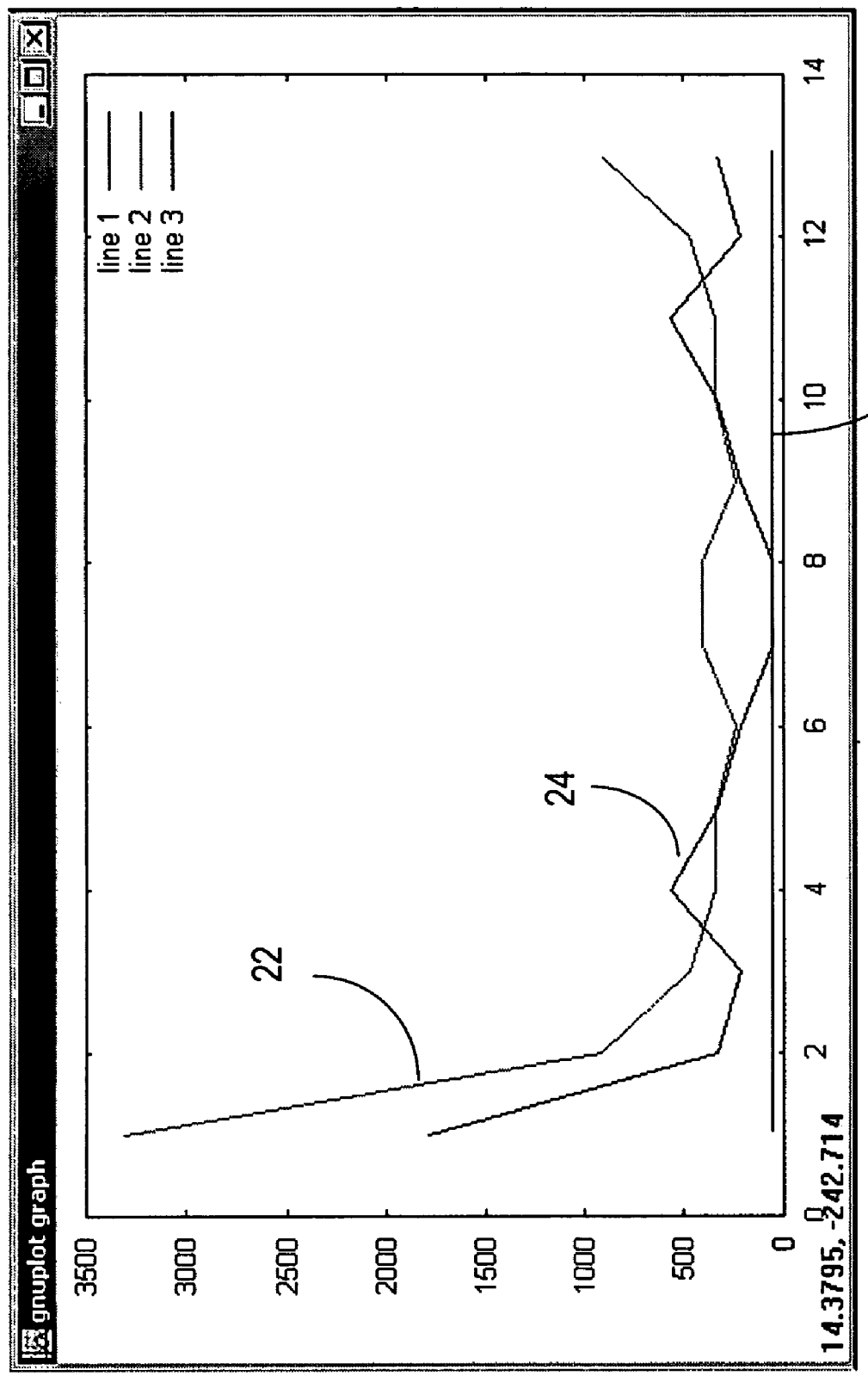
FIG. 2 is a graph of the amplitude envelope created by a set of 38 rules.
Figure 3:
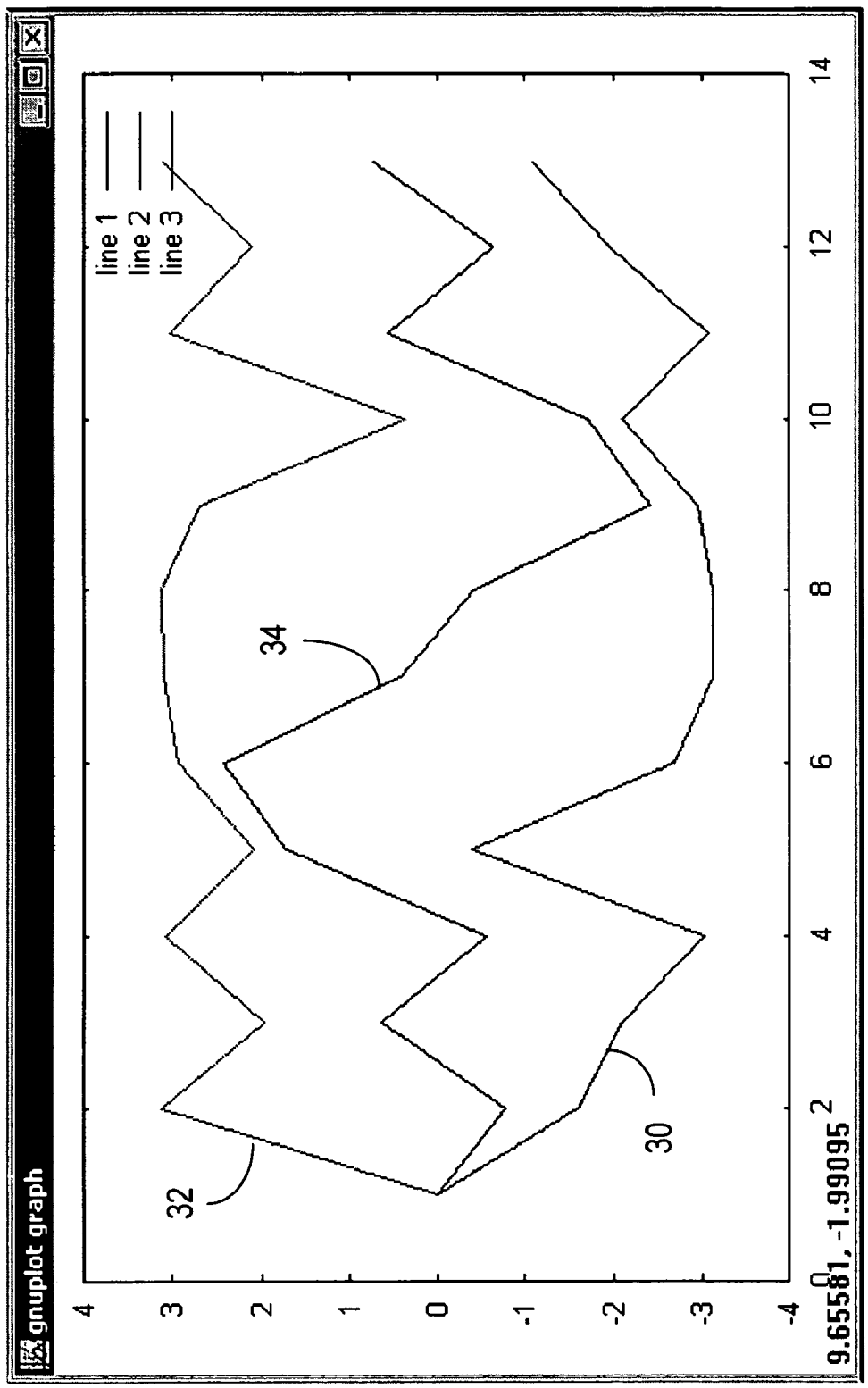
FIG. 3 is a graph of the phase envelope. For the set of rules used in FIG. 2

Both phase and amplitude envelopes should be considered when determining that a match has not occurred. FIGS. 2 and 3 demonstrate an amplitude and phase envelope respectively, created by a set of 38 rules. Lines 20 and 22 in these figures represent the respective minimum and maximum amplitude envelopes, and lines 30 and 32 represent the respective minimum and maximum phase envelopes. Lines 24 and 34 are the respective amplitude and phase components calculated from the key of a candidate packet. Examining first the amplitude envelope in the example of FIG. 2, the respective packet does not match any of the 38 rules, as it has a spectral amplitude 24 (at the frequency value 4) that lies outside of the rule set's amplitude envelope 20, 22. Examining the phase envelope 34, it is apparent that a match may be possible.

In the example of FIGS. 2 and 3, the phase envelope suggests that a match might be possible, but the amplitude envelope has determined that no match has occurred. Obviously, there could be other graphs for the spectral key of an incoming packet, or other amplitude and phase envelopes for the rules sets. For example, in one scenario the amplitude envelopes may imply that a match might be possible, but the phase envelopes determine that no match has occurred. In such cases, the overall decision made is that there is no matching rule. That is to say, a packet's spectral key must be inside both the amplitude and phase spectral envelopes for a positive decision.

For rules containing one or more ranges, the determination of an envelope is more complex. A brute force method of decomposing a single rule with ranges into individual explicit rules is possible, but this process can be computationally expensive. It has been observed that a vertex in a ranged rule is responsible for the minimum and maximum amplitudes at each frequency component. However, there is no relationship between a ranged rule's endpoint phases and the corresponding minimum and maximum phases. One may choose not to use a spectral phase envelope, thereby increasing the possibility of false positives, or make the computational commitment to calculate the phase envelope offline even though it may take a long time.

The accuracy of the method is dependent on a number of degrees of freedom, including the partitioning of the incoming packet keys into words used by the FFT unit 14, the size of the FFT, the nature of the set of rules being examined, and the nature of the packets being classified.

The invention claimed is:

1. A method for filtering packets in a real time stream of incoming packets, comprising:
    creating a key from a field in a packet having a header, the field being specified by a set of packet classification rules;
    transforming the key into a spectral domain key;
    comparing the spectral domain key to a spectral envelope, the spectral envelope comprising both a phase envelope and an amplitude envelope and also corresponding to the set of packet classification rules;
    obtaining a negative decision whenever the spectral domain key falls outside at least one of the phase envelope and the amplitude envelope;
    obtaining a positive decision whenever the spectral domain key falls within both the phase envelope and the amplitude envelope; and
    for said positive decision, directing the packet to a packet filter for determining a specific packet classification rule from the set of packet classification rules that the packet matches.

2. The method of claim 1, further comprising:
    generating the key from a plurality of fields in the header of the packet.

3. The method of claim 1, further comprising:
    generating the spectral envelope offline; and
    storing the spectral envelope in an envelope database.

4. The method of claim 1, further comprising:
    generating the spectral envelope by calculating the phase and amplitude for each rule in the set of packet classification rules; and
    determining the minimum and maximum values at each frequency over all rules of the set of packet classification rules.

5. The method of claim 4, further comprising:
    for a rule using ranges, decomposing the rule into individual explicit rules.

6. A packet filtering system for classifying packets in a real time stream of incoming packets, comprising:
    a key generator that creates a key from one or more fields of a packet, the fields being specified by a set of packet classification rules;
    a Fast Fourier Transform unit that transforms the key into a spectral domain key; and
    an envelope comparator that compares the spectral domain key to a spectral envelope, the spectral envelope comprising both a phase envelope and an amplitude envelope and also corresponding to the set of packet classification rules, and obtains a negative decision whenever the spectral domain key falls outside at least one of the phase envelope and the amplitude envelope, and a positive decision whenever the spectral domain key falls within both the phase envelope and the amplitude envelope.

7. The packet filtering system of claim 6, further comprising:
a packet filter that receives from the envelope comparator only the packets with a positive decision and determining the specific rule of the set of packet classification rules that the packet matches.

8. The packet filtering system of claim 6, further comprising:
an envelope generator that generates an amplitude and a phase envelope for the set of packet classification rules, by determining the minimum and maximum values at each frequency component over all rules of the set of packet classification rules; and
an envelope database that stores the amplitude and phase envelopes for the set of packet classification rules and any additional set of rules used at a router.

* * * * *